United States Patent
Rothman et al.

(10) Patent No.: US 6,303,090 B1
(45) Date of Patent: Oct. 16, 2001

(54) CONVERSION OF DEPLETED URANIUM HEXAFLUORIDE TO A SOLID URANIUM COMPOUND

(75) Inventors: Alan B. Rothman, Willowbrook; Donald G. Graczyk, Lemont; Alice M. Essling, Elmhurst; E. Philip Horwitz, Naperville, all of IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/580,991

(22) Filed: May 17, 2000

(51) Int. Cl.$^7$ .......................... C01G 43/00; C01G 43/025
(52) U.S. Cl. ................ 423/253; 423/10; 423/11; 423/261
(58) Field of Search ................ 423/10, 11, 261, 423/490, 253

(56) References Cited

U.S. PATENT DOCUMENTS 3,806,579 * 4/1974 Carles et al. ..................... 423/258
3,961,027 * 6/1976 Crossley ............................. 423/15

FOREIGN PATENT DOCUMENTS 72-011340 * 4/1972 (JP) .

* cited by examiner

Primary Examiner—Steven Bos
(74) Attorney, Agent, or Firm—Bradley W. Smith; Mark P. Dvorscak; Virginia B. Caress

(57) ABSTRACT

A process for converting $UF_6$ to a solid uranium compound such as $UO_2$ and CaF. The $UF_6$ vapor form is contacted with an aqueous solution of $NH_4OH$ at a pH greater than 7 to precipitate at least some solid uranium values as a solid leaving an aqueous solution containing $NH_4OH$ and $NH_4F$ and remaining uranium values. The solid uranium values are separated from the aqueous solution of $NH_4OH$ and $NH_4F$ and remaining uranium values which is then diluted with additional water precipitating more uranium values as a solid leaving trace quantities of uranium in a dilute aqueous solution. The dilute aqueous solution is contacted with an ion-exchange resin to remove substantially all the uranium values from the dilute aqueous solution. The dilute solution being contacted with $Ca(OH)_2$ to precipitate $CaF_2$ leaving dilute $NH_4OH$.

19 Claims, 1 Drawing Sheet

EXPERIMENTAL VERIFICATION OF (COMPLEXED) URANYL FLUORIDE REMOVAL

Aqueous Process Method

EXPERIMENTAL VERIFICATION OF (COMPLEXED) URANYL FLUORIDE REMOVAL
Figure 1: Aqueous Process Method
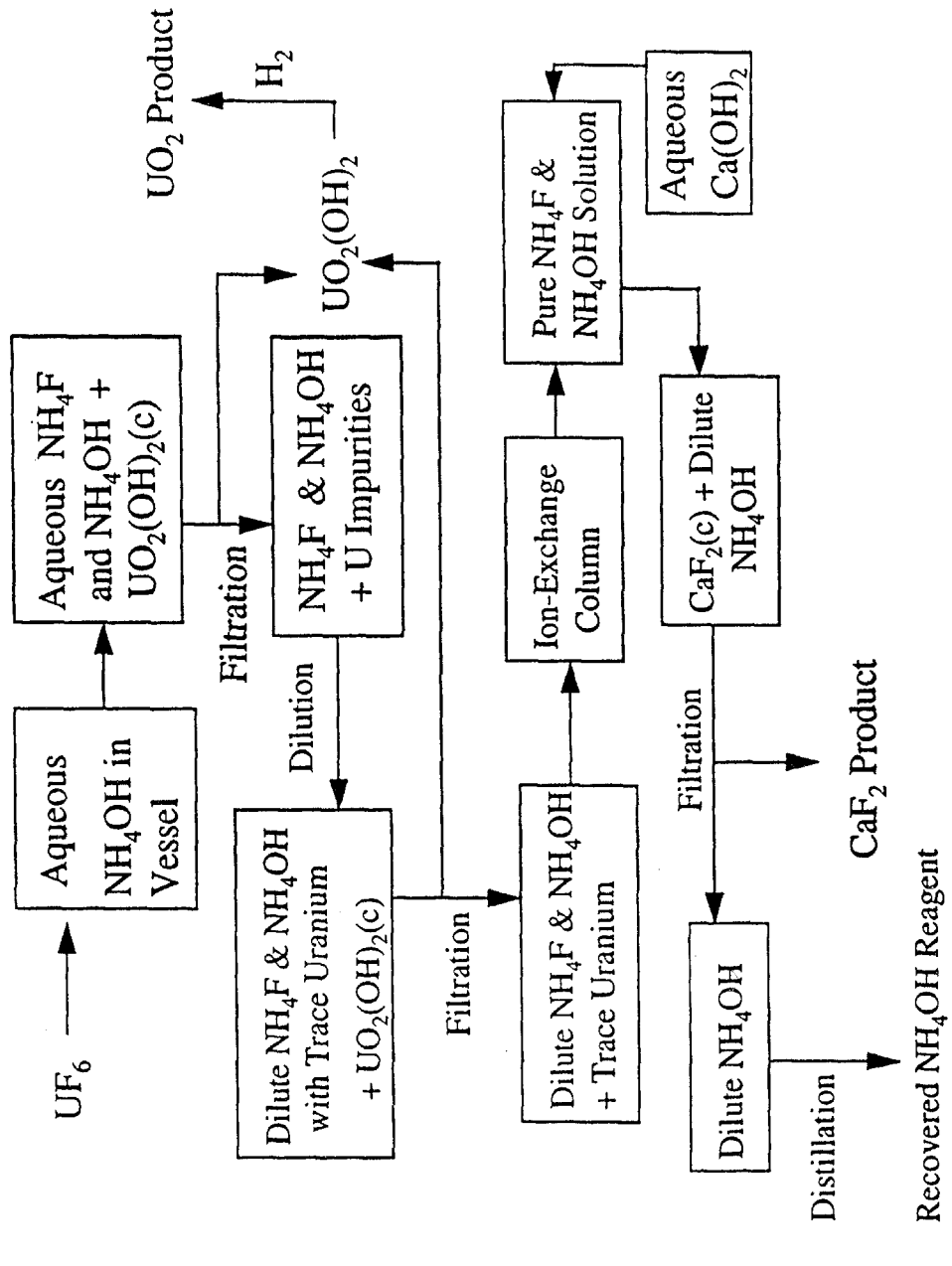

CONVERSION OF DEPLETED URANIUM HEXAFLUORIDE TO A SOLID URANIUM COMPOUND

CONTRACTUAL ORIGIN OF THE INVENTION

The United States Government has rights in this invention pursuant to Contract No. DE-AC02-98CH10913 between the U.S. Department of Energy (DOE) and The University of Chicago representing Argonne National Laboratory.

BACKGROUND OF THE INVENTION

There are large worldwide stored inventories of the depleted uranium hexafluoride ($UF_6$) tailings from past gaseous-diffusion-enrichment plants for nuclear fuel-cycle operations. In the U.S. alone, there are currently ≈700,000 metric tons of that material stored in U.S DOE facilities at Paducah, Ky., Portsmouth, Ohio and Oak Ridge, Tenn. One conversion process considered in the past by the DOE would use steam for high-temperature hydrolysis of the hexafluoride, to convert it to (a) $UO_2$ for use in other nuclear programs or for disposal, and (b) anhydrous HF for industrial use. The present invention relates to a low-temperature aqueous process to convert the hexafluoride to $UO_2$ for use in other nuclear programs, and high-purity calcium fluoride for sale.

SUMMARY OF THE INVENTION

It is an object of the present invention to provide a process for converting $UF_6$ to a solid uranium compound, comprising: contacting $UF_6$ vapor with an aqueous solution of $NH_4OH$ at a pH greater than 7 to precipitate at least some solid uranium values as a solid leaving an aqueous solution containing $NH_4OH$ and $NH_4F$ and remaining uranium values, separating the solid uranium values from the aqueous solution of $NH_4OH$ and $NH_4F$ and remaining uranium values, diluting the aqueous solution of $NH_4OH$ and $NH_4F$ and remaining uranium values with additional water precipitating more uranium values as a solid, leaving trace quantities of uranium in a dilute aqueous solution.

Another object of the present invention is to provide a process for converting $UF_6$ to a solid uranium compound and $CaF_2$, comprising: contacting $UF_6$ vapor with an aqueous solution of $NH_4OH$ at a pH greater than 7 to precipitate at least some solid uranium values as a solid leaving an aqueous solution containing $NH_4OH$ and $NH_4F$ and remaining uranium values, separating the solid uranium values from the aqueous solution of $NH_4OH$ and $NH_4F$ and remaining uranium values, diluting the aqueous solution of $NH_4OH$ and $NH_4F$ and remaining uranium values with additional water precipitating more uranium values as a solid leaving trace quantities of uranium in a dilute aqueous solution, contacting the dilute aqueous solution with an ion-exchange resin to remove substantially all the uranium values from the dilute aqueous solution, and contacting the dilute aqueous solution having substantially all uranium values removed with $Ca(OH)_2$ to precipitate $CaF_2$ leaving dilute $NH_4OH$.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

The present invention together with the above and other objects and advantages may best be understood from the following detailed description of the embodiment of the invention illustrated in the drawings, wherein:

FIG. 1 is a flow chart illustrating the present invention.

DESCRIPTION OF THE PREFERRED EMBODIMENT

The uranium as $UO_2(OH)_2$ is precipitated at a higher pH such as in the range of 7 to about 12 by adding $UF_6$ to the ammonium hydroxide "drop vessel". The trace uranium impurities are extracted from the supernatant fluoride solution before treatment of the supernatant solution with calcium hydroxide to produce calcium fluoride. The advantage of this approach is that it would not require prohibitively large quantities of an ion exchange resin, such as Diphonix®, see Horwitz et al. U.S. Pat. Nos. 5,539,003, 5,449,462, 5,332,531 and 5,281,631, the disclosures of which are incorporated by reference, for those extractions. In addition, the high capacity of the Diphonix® resin for binding the uranium makes it economically attractive to discard it after it has reached its limit of uranium content, rather than trying to regenerate it by stripping that uranium with ammonium carbonate to generate uranyl carbonate. The latter approach, however, could be used if disposition of the Diphonix® waste stream presents a problem. In this approach, the uranyl carbonate is treated with ammonium hydroxide to precipitate additional uranyl hydroxide and regenerate the ammonium carbonate reagent. It should be understood that a variety of ion exchange resins may be used in the inventive process, but the Diphonix® resin is disclosed by way of example only, not by way of limitation.

In the first step of the aqueous conversion process, depleted $UF_6$ is vaporized by sublimation at 56° C. or above and its condensate delivered to a "drop vessel" containing moderately concentrated ammonium hydroxide having a pH in the range of from about 7 to about 12.

The course of the reaction is followed by repeated pH measurements and visual observation of any precipitates formed, as well as chemical analyses of the solid and aqueous phases. Although the reactions are complex in the presence of the concentrated fluorides formed from additions of $UF_6$ to concentrated $NH_4OH$, the stoichiometry for the course of the reactions, past the end point for the precipitation of $UO_2(OH)_2$, may be given as

$$2UF_6 + 14NH_4OH(aq) = (NH_4)_2U_2O_7(c) + 12NH_4F(aq) + 7H_2O \quad (1)$$

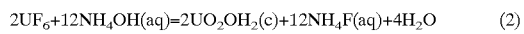

$$2UF_6 + 12NH_4OH(aq) = 2UO_2OH_2(c) + 12NH_4F(aq) + 4H_2O \quad (2)$$

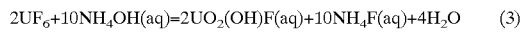

$$2UF_6 + 10NH_4OH(aq) = 2UO_2(OH)F(aq) + 10NH_4F(aq) + 4H_2O \quad (3)$$

$(NH_4)_2U_2O_7$ might not be precipitated with additional of $UF_6$ to dilute $NH_4OH$, if that diuranate could be hydrolyzed in the back-reaction for the postulated equilibrium equation

$$2NH_4OH(aq) + 2UO_2(c) = (NH_4)_2U_2O_7(c) + 3H_2O \quad (4)$$

Experiments were conducted to represent key points for addition of $UF_6$ to moderately concentrated $NH_4OH$ in the stoichiometry ranges between Eqs. 1 and 3. For that purpose, a mixture was made up to the approximate as-added concentrations of 0.5 M $UO_2F_2$, 1.0 M $NH_4F$ and 0.6 M $NH_4OH$.

That mixture represents the addition of U(VI) to $NH_4OH$ to reach a hydroxide-to-$UO_2^{++}$ ion ratio between those at the end-points of Eq's. 2 and 3, but with a fluoride-to-uranium ratio of 4, rather than the ratio of 6 that would result from the addition of $UF_6$ to $NH_4OH$. The purpose of the initial preparation was to add additional $NH_4OH$ to it, as required, to ensure effective precipitation of uranium, analyze the supernatant liquid, and dilute it (if required) to achieve uranium impurity concentrations suitable for extraction with Diphonix® ion exchange resin.

$UO_2F_2$ was prepared by adding water and ≈5 mL of 48%, analytical-grade HF to a Teflon® beaker containing 7.1516 g of $UO_3$, 25 mmol (millimoles), and gently heating the mixture to prevent spattering, to first effect dissolution. The excess HF was then removed by evaporation to dryness. From the factor weights of $UO_3$ and $UO_2F_2$, the dried solid contained 7.7016 g of $UO_2F_2$. However, due to the hygroscopic nature of $UO_2F_2$, the as-dried solid contained 11.854 g of water at the time it was weighed. 25.797 g of additional water were added to the deliquescent solid, and the mixture was warmed to form a canary-yellow $UO_2F_2$ solution designated as Solution A.

Solution B was produced by adding 23.315 g of water to another 100-mL beaker containing 1.829 g of $NH_4F$ and 1.916 g of an aqueous solution of 28% analytical grade $NH_3$ in water. From the factor weight, therefore, Solution B contained 49.38 mmol of $NH_4F$. At 28% $NH_3$, each gram of the 14.8 M $NH_3$ reagent contained 16.43 mmol of either $NH_3$, or $NH_4OH$. So Solution B contained 31.48 mmol of $NH_4OH$. In summary, the combined contents of Solutions A and B were 25.00 mmol of $UO_2F_2$, 49.38 mmol of $NH_4F$, and 31.48 mmol of $NH_4OH$.

Solution A was added slowly to Solution B with stirring to form Solution C. No precipitation was formed in Solution C because the ratio of added hydroxide to that of $UO_2^{2+}$ ion was only 26% greater than that for a solution of the highly soluble salt $UO_2(OH)_2 \cdot UO_2F_2 \cdot H_2O$. Therefore, several more milliliters of the concentrated $NH_4OH$ had to be added before observable precipitation of uranyl hydroxide. This further addition of 14.8 M $NH_4OH$ was followed by checking the aqueous phase with pH paper. The quantity of additional $NH_4OH$ that was added was not measured. It was estimated that the total addition of $NH_4OH$ was 3–5 times the 31.48 mmol amount originally present in Solution C.

The mixture of aqueous and solid phases from addition of excess $NH_4OH$ to Solution C was divided between two 50-mL polypropylene centrifuge tubes. The solid settled nicely after ≈2 minutes, but the canary-yellow appearance of the supernatant liquid indicated the presence of dissolved uranyl products still remaining in the aqueous phase. The supernatant from the two centrifuge tubes were combined, and the pH of the ≈60-mL of that supernatant, Solution S, was 8.92. A 500 μL aliquot of the supernatant, Solution S, was diluted to 10 mL with water for a 1/20 dilution and submitted to a laboratory for uranium analysis. From that analysis, it was determined that the as-diluted uranium content of the aliquot sample was 257 μg/mL, or a total uranium content of 5.14 mg/mL, i.e., 0.0216 M total uranium in S. The analytical chemistry determinations for the concentrations of constituents for ≈ 60 mL of Solution S were $[U]_T$=0.0216 M, $[F]_T$=0.656 M, and $a_{OH^-}$=8.32×10$^{-6}$ M, where $[U]_T$ is the total concentration of uranium, in the uranyl fluoride complexes; and $[F]_T$ is the total concentration of complexed and noncomplexed gram atoms of fluoride per mL. $a_{OH^-}$, the hydroxyl ion activity, was determined from the pH measurement of 8.92 and the relations pH=$-\log a_{H+}$, pOH+$\log a_{OH-}$, and pH+pOH=14, where $a_{H+}$ represents the hydrogen ion activity.

It should be understood that while ion activities are their activity coefficients are frequently expressed in terms of molality, i.e., moles per 1000 g of solvent, the concentrations given here have all been in terms of molarity, i.e., moles per liter of solution. Those solutions were derived, from dividing the millimolar quantities of additives in the initial preparation by the approximate 60-mL volume of that preparation. But there is no appreciable difference between the polarities and molalities of those constituents within the uncertainty of that volume. That is so because the total mass of the water solvent in S. i.e., the sum of the masses of water in A, B, the as-dried $UO_2F_2$, and the 1.916 g of 28% $NH_3$ reagent was determined to be 62.341 g.

The 0.0216 M concentration of uranium in S was too large to be processed for uranium extraction without using a prohibitively large amount of the Diphonix® ion-exchange resin. Therefore, samples were prepared for such tests from 1/10, 1/20, and 1/50 dilutions of S. Furthermore, due to equilibria that will be discussed later, it was found that those dilutions, as with the 1/20 diluted aliquot taken for the first ICP analysis, resulted in the precipitation of additional uranyl material after the diluted material was allowed to stand.

The effect of additional precipitation on dilution leads to a better extraction plan for the overall conversion process, and is an important part of the invention. As shown in FIG. 1, the supernatant from the first precipitation of uranyl material was diluted to effect additional precipitation by the dilution. Then the supernatant from that dilution was processed to extract its trace uranium contents with the Diphonix® ion-exchange resin. Subsequently, the highly purified diluted solution was treated with $CA(OH)_2$ to precipitate $CaF_2$. An option for the recovery of the $NH_3$ reagent is to distill it from the supernatant from that process step and collect it in water to concentrate it.

The pH values of the supernatant from the 1/10, 1/20, and 1/50 dilutions were measured with a pH meter. An aliquot of the liquid phase resulting from each dilution, after it settled, was submitted to the laboratory and its $[U]_T$ concentration was measured in a preliminary ICP analysis. Table I gives the characterizations of the supernatant S and its dilutions, designated in the table as D(1/10), D(1/20), and D(1/50).

The pH values were used to determine the respective OH-ion activities.

With the concentrations of constituents in Solution C, before precipitation of uranium, the possible soluble fluoride complexes are $UO_2F$, $UO_2F_2$, $UO_2F_3^-$, $UO_2F_4^{2-}$, and $UO_2F_5^{3-}$. Formation of those complexes with $UO_2^{2+}$ competes with the reaction between $UO_2^{2+}$ and the OH-(from $NH_4OH$) to form $UO_2(OH)_2$. Consequently, it is assumed that when the stoichiometric quantity of $NH_4OH$ necessary to precipitate $UO_2(OH)_2$ is added to aqueous $UO_2F_2$, a small amount of the uranium that would have precipitated is tied up as soluble fluoride complexes. Therefore, as observed in the addition of extra $NH_4OH$ to the target Solution C, precipitation did not occur until a considerable excess of $NH_4OH$ was added, with a residual 0.0216 M concentration of total uranium remaining in the supernatant. Assuming that $UO_2(OH)_2$ was the only compound precipitated from solution, the equilibrium phenomena involved with those effects might be represented by some combination of equations such as $$UO_2(OH)_2(c) = UO_2^{2+}(aq) + 2OH^-(aq) \tag{5}$$

$$UO_2(OH)_2(c) + F^-(aq) = UO_2F^+(aq) + 2OH^-(aq) \tag{6}$$

$$UO_2(OH)_2(c) + 2F^-(aq) = UO_2F_2(aq) + 2OH^-(aq) \tag{7}$$

$$UO_2(OH)_2(c) + 3F^-(aq) = UO_2F_3^-(aq) + 2OH^-(aq) \tag{8}$$

$$UO_2(OH)_2(c) + 4F^-(aq) = UO_2F_4^{2-}(aq) + 2OH^-(aq) \tag{9}$$

$$UO_2(OH)_2(c) + 5F^-(aq) = UO_2F_5^{3-}(aq) + 2OH^-(aq) \tag{10}$$

The OH−ion released from the forward reactions is mostly tied up by reaction with the $NH_4^+$ ion to buffer the solution somewhat through the equilibrium $$NH_4^+(aq) + OH^-(aq) = NH_4OH(aq) \tag{11}$$

where the dissociation constant for $NH_4OH$ is given by $$K_{11} = \frac{{}^aNH_4^+ \cdot {}^aOH^-}{{}^aNH_4OH} = 1.82 \times 10^{-5} \tag{12}$$

and where the a values represent the thermodynamic activities of the chemical entities in Eq. 12. Clarification of that matter is given below in a discussion of the dissociation constant of $NH_4OH$.

Because of the buffering effect quantified in Eq. 12, dilution of the supernatant, Solution S, would cause significantly more reduction of the F− ion concentration than that of the OH− ion concentration. Therefore, it would be expected that equilibrium Eqs. 6–10 would be shifted more to the left as the fluoride concentration is reduced by dilution of the supernatant. That expectation is in agreement with the experimental observations that more $UO_2(OH)_2$ precipitated with dilution of the supernatant. Furthermore, the $NH_4OH$ dissociated to supply more OH− ions for that precipitation with a consequent increase of the $$\frac{{}^aNH_4^+}{{}^aNH_4OH}$$

ratio of the supernatant. That effect together with Eq. 12 would explain the gradual, i.e., somewhat buffered, trend toward lower pH-values (in addition to the precipitation of $UO_2(OH)_2$) that was observed with dilution of the supernatant. Also, it is possible that some of the $NH_4OH$ reacted with the $UO_2(OH)_2$ precipitate to produce ammonium diuranate. Consequently, it was not possible to determine the total amount of $NH_4OH$ that was added to precipitate U(VI) from that solution.

In a consideration of the ionic strength of Solution S and its effect on activity coefficients, it was assumed that the fluoride ion concentration was ≈1.66 M, even though it was somewhat lower because of the fluoride tied up as uranyl fluoride complexes in the 0.0216 M concentration of total uranium. From the electrical neutrality of the solution, the $NH_4^+$ ion concentration would also be ≈1.66 M. Published values of mean activity coefficients for a number of electrolytes over a molality range of 0.001 to 3.0 are available. No data are given for $NH_4F$, but it is assumed to have the same mean activity coefficient as NaCl which has the same mean ionic diameter as $NH_4F$. At a molality, molarity, or ionic strength of 1.66, the mean activity coefficient, y± of NaCl is ≈0.66. Therefore, because individual activity coefficients cannot be measured directly, t is assumed that the activity coefficients of both $NH_4^+$ and F− ions were ≈0.66 and that $$\frac{K_{11}}{k_{11}}$$

The application of the Diphonix® ion-exchange resin in the extraction of transuranic and other metals from aqueous media has been described. Such applications have found that the resin's performance for extraction of U(IV) and U(VI) is generally improved with more acidic aqueous media. That would be of particular benefit for the extraction of U(VI) from aqueous fluoride media, in which the fluoride could be tied up as either $HF_2^-$ or HF rather than as fluoride complexes of the uranyl ion. But the performance of Diphonix® ion-exchange resin in extracting U(VI) from weakly basic solutions of $NH_4OH$ and $NH_4F$ was not known. Therefore, the procedure of removing U(VI) impurities from weakly basic $NH_4OH$—$NH_4F$ media is new.

Accordingly, 4-mL aliquot samples of the diluted supernatant Solution S were taken, after settling of additional uranium precipitates that resulted from those dilutions, for interaction with the Diphonix® ion-exchange resin, along with sibling 4-mL control samples that were not subjected to such interactions. The diluted controls samples are designated as DU(1/10), DU(1/20), and DU(1/50). Their total uranium concentrations, $U_o$, to indicate the noninteracted concentrations, were measured at a laboratory as 37.4, 15.5, and respectively. These aliquots were allowed to stand longer than the D(1/10), D(1/20), and D(1/50) aliquots taken previously for the preliminary (total) uranium analyses, which for comparison were 64.5, 5.00, and 3.09 μg/mL, respectively. It is believed that the DU sample values are more reliable, due to their longer setting time.

The wet Diphonix® ion-exchange resin used for the study was a mixture of 200-mesh solid Diphonix® particles and water. A sample of the wet Diphonix® ion-exchange resin that was used for the example was weighed, dried, and reweighed to determine that the dry (or active) part of the mixture was 29.82%. Then, 4-mL aliquots of each of the supernatant liquids from those dilutions, designated DD(1/10), DD(1/20), and Dd(1/50), were each mixed with about 0.22 to 0.24 g of the wet resin, containing 66 to 72 mg, respectively, of the dry (or active) Diphonix® ion-exchange resin component. An equilibrium distribution of uranium between the liquid and solid (Diphonix®) ion-exchange resin phase is each of the batch mixtures was then produced by using a magnetic stirrer for ≈1.5 hr. After establishing equilibrium, a liquid-phase sample was removed from each of the batch mixtures for analysis, using a f-mL syringe with a 0.8-μm polycarbonate filter.

The dry weight distribution factor, D, was determined for each of the three extractions from the relation $$D = \frac{\left\{\frac{U_o - U_f}{W}\right\}}{\left\{\frac{U_f}{V}\right\}}$$

where $U_o$ is the uranium concentration in a solution that was not interacted with Diphonix® ion-exchange resin, $U_f$ is the uranium concentration in that solution after its interaction with Diphonix® ion-exchange resin, W is the dry weight of Diphonix® ion-exchange resin for that interaction in grams, and V is the volume of interacted sample in mL.

The results of those experiments are given in Table 2. In all cases, V and 4 mL.

It was determined that by the combined effects of either a 1-to 20 or 1-to-50 dilution (with the phenomenon of additional removal of uranium by precipitation in those dilutions) and ion-exchange with the Diphonix® resin, the inventive process produced a uranium content in the $NH_4F$—$NH_4OH$ solution of 30–40 parts per billion (ppb), starting with the original content of 5.14 parts per thousand in supernatant Solution S. As indicated in FIG. 1, $Ca(OH)_2$ is added to the highly purified $NH_4F$—$NH_4OH$ solution to yield $CaF_2$, rather than using the reverse order of addition. With that order of addition, the $NH_4^+$ of the $NH_4F$—$NH_4OH$ couple in the purified solution scavenges OH- ion from the $Ca(OH)_2$ to reduce the OH- ion concentration to a value many orders of magnitude lower than that from the saturated solubility of pure $Ca(OH)_2$. Consequently, the lower pH values rom the preferred order of addition, i.e., the addition of $Ca(OH)_2$ to the $NH_4F$—$NH_4OH$ rather than the reverse order of addition, should cause less coprecipitation of uranium impurities to yield a very pure $CaF_2$ product.

The D values reflect the distribution of positive ions like $UO_2^{2+}$ and $UO_2F^+$ (that can be bound to the Diphonix®) ion-exchange resin between the Diphonix® ion-exchange resin and the aqueous phase. Therefore, the experimental results indicate there was a greater proportion of those positive ions in the 1-to-20 diluted solution than in the 1-to-10 diluted solution. However, it also appears that there might have been some base level (≈30 parts per billion) of uranium-bearing material that was nonreactive with the Diphonix® ion-exchange resin.

Based on the experiments performed, it is believed that settling time is critical to obtaining the best results and should occur before analyzing the supernatant solution from a diluted control sample. Therefore, it is recommended that sibling aliquots of those dilutions used for control analyses should not only be allowed to stand, but they should also be stirred with a magnetic stirrer, similar to that used for their sibling aliquots that were mixed and interacted with Diphonix® ion-exchange resin for the extraction studies in these examples. It is believed to be advisable to stir all parts of a diluted solution for better equilibrium.

While there has been disclosed what is considered to be the preferred embodiment of the present intention, it is understood that various changes in the details may be made without departing from the spirit, or sacrificing any of the advantages of the present invention.

What is claimed is:

1. A process for converting $UF_6$ to a solid uranium compound, comprising:

contacting $UF_6$ with an aqueous solution of $NH_4OH$ at a pH greater than 7 to precipitate at least some solid uranium values as a solid leaving an aqueous solution containing $NH_4OH$ and $NH_4F$ and remaining uranium values, separating the solid uranium values from the aqueous solution of $NH_4OH$ and $NH_4F$ and remaining uranium values, diluting the aqueous solution of $NH_4OH$ and $NH_4F$ and remaining uranium values with additional water precipitating more uranium values as a solid leaving trace quantities of uranium in a dilute aqueous solution.

2. The process of claim 1, wherein the process is conducted at a pH in the range of greater than 7 to about 12.

3. The process of claim 1, wherein solid $UO_2(OH)_2$ is produced and thereafter reduced to solid $UO_2$.

4. The process of claim 1, wherein the aqueous solution of $NH_4F$ and $NH_4OH$ and remaining uranium values is diluted by adding water in excess of ten times the volume of the aqueous solution of $NH_4F$ and $NH_4OH$ and remaining uranium values.

5. The process of claim 4, wherein the added water is in excess of between about twenty and about fifty times the volume of the aqueous solution of $NH_4F$ and $NH_4OH$ and remaining uranium values.

6. The process of claim 1, and further including the step of retaining the diluted aqueous solution of $NH_4OH$ and $NH_4F$ and remaining uranium values for a time sufficient to allow solid uranium values to settle out leaving trace quantities of uranium.

7. The process of claim 1, wherein the uranium concentration after contacting the dilute aqueous solution with an ion exchange resin is less than about 40 ppb and the ion exchange resin is phosphoric acid based.

8. A process for converting $UF_6$ to a solid uranium compound and $CaF_2$, comprising: contacting $UF_6$ with an aqueous solution of $NH_4OH$ at a pH greater than 7 to precipitate at least some solid uranium values as a solid leaving an aqueous solution containing $NH_4OH$ and $NH_4F$ and remaining uranium values, separating the solid uranium values from the aqueous solution of $NH_4OH$ and $NH_4F$ and remaining uranium values, diluting the aqueous solution of $NH_4OH$ and $NH_4F$ and remaining uranium values with additional water precipitating more uranium values as a solid leaving trace quantities of uranium in a dilute aqueous solution, contacting the dilute aqueous solution with an ion-exchange resin to remove substantially all the uranium values from the dilute aqueous solution, and contacting the dilute aqueous solution having substantially all uranium values removed with $Ca(OH)_2$ to precipitate $CaF_2$ leaving dilute $NH_4OH$.

9. The process of claim 8, wherein the process is conducted at a pH in the range of greater than b 7to about 12.

10. The process of claim 8, wherein the $UF_6$ is added to $NH_4OH$ having a pH in excess of about 11.

11. The process of claim 8, wherein solid $UO_2(OH)_2$ is produced and thereafter reduced to solid $UO_2$.

12. The process of claim 11, wherein the solid $UO_2(OH)_2$ is reduced to $UO_2$ by contact with hydrogen gas.

13. The process of claim 8, wherein the aqueous solution of $NH_4F$ and $NH_4OH$ and remaining uranium values is diluted by adding water in excess of ten times the volume of the aqueous solution of $NH_4F$ and $NH_4OH$ and remaining uranium values.

14. The process of claim 13, wherein the added water is in excess of between about twenty and about fifty times the volume of the aqueous solution of $NH_4F$ and $NH_4OH$ and remaining uranium values.

15. The process of claim 8, wherein the dilute aqueous solution is contacted with a disphosphoric acid based ion-exchange resin and the resultant solution has a uranium concentration of less than about 40 ppb.

16. The process of claim 8, and further including the step of retaining the diluted aqueous solution of $NH_4OH$ and $NH_4F$ and remaining uranium values for a time sufficient to allow solid uranium values to settle out leaving trace quantities of uranium.

17. The process of claim 16, wherein the diluted aqueous solution of $NH_4OH$ and HF and remaining uranium values are agitated during the retaining step.

18. The process of claim 8, wherein the process is conducted continuously.

19. The process of claim 8, wherein the process is conducted in batches.

* * * * *